United States Patent Office 3,175,995
Patented Mar. 30, 1965

3,175,995
PREPARATION OF ORGANOPOLYSILOXANES BY SILOXANE REARRANGEMENT
John R. Elliott and Glenn D. Cooper, Schenectady, N.Y., assignors to General Electric Company, a corporation of New York
No Drawing. Filed Apr. 6, 1962, Ser. No. 185,514
18 Claims. (Cl. 260—46.5)

This invention is concerned with a method for the preparation of organopolysiloxanes by siloxane rearrangement. One aspect of the invention relates to condensation or equilibration of low molecular weight organopolysiloxanes to form oils, resins, and gums of higher molecular weight by contacting such polysiloxanes with a basic catalyst in the presence of an organosulfur compound (hereinafter so designated) selected from the class consisting of alkyl sulfones and alkyl sulfoxides in which the total number of carbon atoms is at most 4, as for example, tetramethylene sulfoxide, tetramethylene sulfone; compounds of the formula QXQ where Q is either methyl or ethyl and X represents a member of the class of

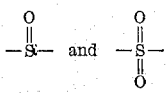

radicals, including dimethyl sulfoxide, dimethyl sulfone, diethyl sulfone, diethyl sulfoxide, methyl ethyl sulfoxide, methyl propyl sulfone, etc. Another aspect of the invention involves converting a high molecular weight organopolysiloxane gum, resin, gel, fluid, etc., to lower molecular weight organopolysiloxanes by equilibration with an organopolysiloxane composed largely of monofunctional units by treatment with a basic catalyst in the presence of the aforesaid organosulfur compound.

It is well known that one may convert lower molecular weight organopolysiloxanes such as, for example, cyclic organopolysiloxanes containing two organic radicals attached directly to silicon atoms or mixtures of the aforesaid cyclic polysiloxanes and linear organopolysiloxanes such as, for example, hexamethyldisiloxane, or higher linear organopolysiloxanes in which all of the valences of the silicon atoms, other than the valences which make up the siloxane chains are satisfied by organic radicals, for instance, hydrocarbon radicals, by rearrangement and/or condensation using basic catalysts. Such condensations and equilibrations can be brought about by contacting the organopolysiloxanes or mixtures of organopolysiloxanes with a suitable basic material (hereinafter referred to as "catalyst"), such as alkali-metal hydroxides, alkali-metal silanolates, alkali-metal alkoxides, quaternary ammonium hydroxides, quaternary ammonium alkoxides, quaternary phosphonium hydroxides, quaternary phosphonium alkoxides, etc., and thereafter heating the mixture at an elevated temperature to form the desired organopolysiloxane; for instance, in the case of the cyclic diorganopolysiloxanes one obtains high molecular weight organopolysiloxanes, usually gums or solid resins.

Although these reactions proceed at a fairly good rate, they nevertheless require elevated temperatures of the order of from 100–200° C. Moreover, although the length of time required is not too excessive, nevertheless, it would be desirable to find means for accelerating the above reactions and reducing the time for obtaining the desired product.

Unexpectedly, we have discovered that the modification of organopolysiloxanes or siloxane rearrangement in the presence of the usual catalysts for this purpose can be greatly accelerated and the temperatures at which this rate of increase is effected, can be greatly reduced, by employing an organosulfur compound in combination with the catalyst. When the organosulfur compound is employed under such conditions, we have found that the times for reaction are reduced by as much as several fold or more, and the temperatures at which the reaction proceeds can be reduced, often to room temperature, and advantageously at temperatures of from about 40°–100° C.

The organopolysiloxanes used as starting materials in the present invention may be described as having the average structure (I)  

where R is an organic radical, for instance, a member selected from the class consisting of alkyl (including cycloalkyl) radicals, e.g., methyl, ethyl, propyl, butyl, octyl, cyclohexyl, cycloheptyl, etc., radicals; alkenyl radicals, e.g., vinyl, allyl, cyclohexenyl, etc., radicals; aryl radicals, e.g., phenyl, diphenyl, etc., radicals; alkaryl radicals, e.g., tolyl, xylyl, ethylphenyl, etc., radicals; aralkyl radicals, e.g., benzyl, phenylethyl, etc., radicals; and halogenated aryl radicals, e.g., chlorophenyl, dibromophenyl, etc., radicals; cyanoalkyl radicals, e.g., cyanomethyl, β-cyanoethyl, β-cyanopropyl, etc., radicals; and $a$ has a value from about 1.2 to less than 3, e.g., to about 2.5. In addition to the R radicals all being the same, it should be understood that R also represents mixtures of the aforesaid radicals. The organopolysiloxanes having the average structure of Formula I may be made up of monofunctional, difunctional or trifunctional siloxane units having the structural formulas:

$(R)_3SiO_{0.5}$
$(R)_2SiO$
$(R)SiO_{1.5}$ or mixtures of the above siloxane units. It is obvious that when the starting materials contain some monofunctional siloxane units, difunctional and/or trifunctional units must also be present in order for the average structure to fall within Formula I. For the same reason, when the starting materials contain some trifunctional units, difunctional and/or monofunctional units must also be present. The starting material may be a specific organopolysiloxane, a mixture of specific organopolysiloxanes, or partially condensed organopolysiloxanes as long as the average structure of the starting material falls within the scope of Formula I. For example, the starting material may be a cyclic organopolysiloxane falling within the scope of Formula II below.

(II)  

where R is as defined above and $n$ is an integer greater than 2, e.g., from 3 to 10 or more. The relatively low molecular weight organopolysiloxane may also be a mixture of cyclic organopolysiloxanes within the scope of Formula I with linear compounds having the formula:

(III)  

where R is as defined above and $m$ is a whole number from 0 to 20. The relatively low molecular weight organopolysiloxane may also be a mixture of cyclic organopolysiloxanes within the scope of Formula II with low molecular weight branched-chain organopolysiloxanes such as are disclosed in Patnode U.S. Patents 2,469,888 and 2,469,890. Specifically the compositions may have the formula

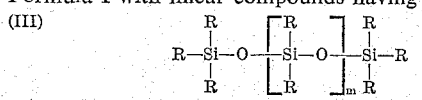

where $b$ has a value from 2.001 to 2.5. Where more than one specific compound is used as the low molecular weight starting material, the organic radicals attached to one of the compounds may be different from those attached to the other compounds. For example, mixtures of octamethylcyclotetrasiloxane and octaethylcyclotetrasiloxane and mixtures of octamethylcyclotetrasiloxane and tetramethyltetravinylcyclotetrasiloxane may be the starting materials of the present invention. Included among the organopolysiloxanes which may be treated in accordance with our invention are mixtures of polysiloxanes of the formula

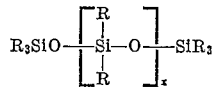

and

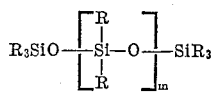

where R and $m$ have the meanings given above, and $x$ is a value, preferably a whole number, from 50 to 100,000 or more.

The condensation and rearrangement (i.e., basic) catalyst employed in the practice of this invention may be any one of those numbers used for the purpose including alkali-metal hydroxides (e.g., sodium hydroxide, potassium hydroxide, cesium hydroxide, etc.); alkali-metal silanolates (e.g., the potassium salt of methylsilanetriol, the potassium salt of phenylsilanetriol, etc.); quaternary ammonium compounds (e.g., benzyl trimethyl ammonium hydroxide, tetramethyl ammonium hydroxide, trimethyl ammonium butoxide, etc.), and quaternary phosphonium compounds of the formula (IV)          $(R')_4POR''$ where $R'$ represents a member selected from the same class of radicals and mixture of radicals recited above for R, and $R''$ is a member selected from the class consisting of hydrogen and alkyl radicals recited for R above. Specific compounds within the scope of Formula IV include, for example, tetramethyl phosphonium hydroxide, tetraethyl phosphonium hydroxide, tetra-n-butyl phosphonium hydroxide, dimethyldiethyl phosphonium hydroxide, phenyltrimethyl phosphonium hydroxide, butyltricyclohexyl phosphonium hydroxide, tetramethyl phosphonium methoxide, tetrabutyl phosphonium butoxide, etc., many examples of such quaternary phosphonium compounds being more particularly disclosed in U.S. Patent 2,883,366, issued April 21, 1959; etc. The amount of the catalyst which may be employed can be varied widely and preferably is within the range of from about 0.0001 to 2 percent or more, by weight, based on the weight of the organopolysiloxane (or organopolysiloxanes) undergoing reaction.

The amount of organosulfur compound employed in the practice of the present invention may be varied widely; amounts as small as 0.005 percent, by weight, based on the weight of the organopolysiloxane (or organopolysiloxanes) undergoing reaction, have an effect on the rate of reaction or on the temperature at which reaction can be effectively carried out. As the amount of the organosulfur compound increases, the rate of the reaction also increases and if excessive amounts of the organosulfur compound are employed it will be more difficult to control the reaction. Therefore, caution should be exercised under each set of conditions depending on the catalyst used, the concentration of catalyst, the particular organopolysiloxane undergoing reaction, etc. The amount of the organosulfur compound can accordingly be varied widely and may range in an amount up to about 50 percent or more, by weight, based on the weight of the organopolysiloxane.

The means for carrying out the reaction can also be varied widely. Generally, it is only necessary to add the catalyst to the organopolysiloxane, incorporate the organosulfur compound and allow the mixture of ingredients to remain at room temperature (e.g., about 25° C.) or heat the mixture of ingredients at the desired temperature conducive to the formation of the desired product. In some instances where the reaction rate may be sufficiently high at room temperature or thereabouts, heating of the reaction mixture can be dispensed with.

In order that those skilled in the art may better understand how the invention may be practiced, the following examples are given by way of illustration and not by way of limitation. All parts and percents are by weight.

EXAMPLE 1

About 50 parts octamethylcyclotetrasiloxane was mixed with about 0.5 part dimethyl sulfoxide and 0.5 part of a one percent weight suspension of potassium hydroxide in octamethylcyclotetrasiloxane. The mixture of ingredients was heated with stirring at 131° C. Within one minute, the solution became so viscous that the stirrer was stopped. After five minutes, the reaction vessel was cooled and the product thus obtained was a high molecular weight polydimethylsiloxane gum having a molecular weight well in excess of 100,000. When the above test was carried out in the absence of dimethyl sulfoxide, no apparent change in viscosity of the octamethylcyclotetrasiloxane occurred even after 20 minutes at the above temperature and it was only after about 40 minutes that any change in viscosity was noted.

EXAMPLE 2

In this test, about 50 parts octamethylcyclotetrasiloxane was mixed with about 0.7 (1.4%) part dimethyl sulfoxide and about 0.5 part of the above one percent suspension of potassium hydroxide in octamethylcyclotetrasiloxane. The mixture of ingredients was heated at 95–98° C. After three minutes, the reaction mixture became extremely viscous and after eight minutes, there was obtained a gum having a molecular weight in excess of 450,000 as measured by intrinsic viscosity in toluene at 25° C. in accordance with the procedure outlined in J. App. Physics 17, 1020 (1946). When the same test was carried out without the dimethyl sulfoxide, there was no apparent increase in viscosity even after 5 hours at this temperature.

EXAMPLE 3

In this example, octamethylcyclotetrasiloxane was mixed with one percent, by weight, dimethyl sulfoxide, and 0.01 percent, by weight, potassium hydroxide. The mixture of ingredients was then allowed to stir at room temperature (about 27° C.). It was found that after 4½ hours at room temperature, the viscosity began to increase rapidly and produced a gum which stopped the stirrer within a few minutes after this time elapse. When the same test was carried out in the absence of the dimethyl sulfoxide, no apparent changes in viscosity of the octamethylcyclotetrasiloxane was noted even after stirring for five days at room temperature.

EXAMPLE 4

In this example 48 parts of octamethylcyclotetrasiloxane was stirred with 0.5 part of a 1% suspension of potassium hydroxide in octamethylcyclotetrasiloxane and 0.24 part (0.5%, by weight,) of dimethyl sulfoxide in a constant temperature bath at 100° C. Within five minutes the mixture had become extremely viscous and within ten minutes a thick gum was formed which stopped the mechanical stirrer. In a parallel experiment carried out in the same way but without the dimethyl sulfoxide, no change in viscosity was noted in thirty minutes.

EXAMPLE 5

In this example, equal molar concentrations of octamethylcyclotetrasiloxanes and hexamethyldisiloxane were mixed together and 0.01 percent, by weight, KOH, based on the weight of the mixture, was added as catalyst. The reaction mixture was divided in two parts. To one part, one percent, by weight, of dimethyl sulfoxide, based on the weight of the mixture of methylpolysiloxanes was added, while dimethyl sulfoxide was omitted from the other part. Each of the mixtures was heated at 80° C. with stirring, and the course of the reaction was followed by measurement of the viscosity of the mixture with the elapse of time. As a result of these tests, it was found out that no detectable increase in viscosity (initial viscosity 1.26 centistokes) occurred even after 119 hours in the case where the dimethyl sulfoxide was absent. However, in the reaction mixture containing one percent dimethyl sulfoxide, the viscosity increased rapidly reaching a maximum of approximately 36.4 centistokes in one hour.

EXAMPLE 6

In this example the conditions were repeated similarly as in Example 5 with the exception that 0.2 percent, by weight, potassium trimethylsilanolate was added in place of the KOH. Otherwise, the amount of dimethyl sulfoxide and the molar concentrations of the octamethylcyclotetrasiloxane and hexamethyldisiloxane were the same. The silanolate dissolved almost immediately on addition to the mixture of methylpolysiloxanes at 80° C. Again, the effect of dimethyl sulfoxide on the equilibration of the hexamethyldisiloxane and octamethylcyclotetrasiloxane was determined by means of viscosity increase. When the dimethyl sulfoxide was absent, there was an increase in viscosity up to 11.8 centistokes in approximately 70 hours. However, in the case where the one percent dimethyl sulfoxide was added to the mixture of ingredients, a maximum viscosity of 14.6 centistokes was reached in 30 minutes.

EXAMPLE 7

In order to determine the time necessary to attain an equilibrium mixture in the equilibration of two organopolysiloxanes as for instance, a trimethylsiloxy chain-stopped polydimethylsiloxane and hexamethyldisiloxane, the following tests were carried out. A mixture of 946.3 parts octamethylcyclotetrasiloxane and 74.5 parts hexamethyldisiloxane was shaken at room temperature for 48 hours in the presence of about one percent, by weight, of concentrated (96%) sulfuric acid. This produced an oil having a viscosity of about 23.5 centistokes at 25° C. and composed of a mixture of trimethylsiloxy chain-stopped polydimethylsiloxanes of the formula

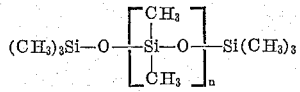

where $n$ is a whole number greater than 1. After washing the product with water and drying it with sodium carbonate, 730.6 parts of this oil was mixed with 290 parts hexamethyldisiloxane to give a 2 to 1 molar ratio of dimethylsiloxy units to trimethylsiloxy units (the mixture having a viscosity of about 6.2 centistokes). To this mixture was added about 0.2 percent, by weight, thereof potassium trimethylsilanolate. Two parallel tests were carried out similarly as above in Example 5 at 80° C. In one test, 250 parts of this KOH-containing oil was mixed with 1 percent, by weight, dimethyl sulfoxide, and in another test the same mixture was used without the dimethyl sulfoxide. As a result of heating each mixture at 80° C., it was found that the mixture containing the dimethyl sulfoxide reached an equilibrium viscosity (about 2.95 centistokes) in about 24 hours, while in the case where no dimethyl sulfoxide was employed, there was no indication of any reaction even after 146 hours.

EXAMPLE 8

In this example, 582 parts octamethylcyclotetrasiloxane and 324 parts hexamethyldisiloxane were mixed together and of this mixture 250 parts were placed in a reaction vessel equipped with a stirrer. The reaction vessel was immersed in a constant temperature bath at 80° C. and about 2 parts of a one percent suspension of potassium hydroxide in octamethylcyclotetrasiloxane was added. At frequent intervals while the mixture was stirred and heated at 80° C., small portions of the mixture were removed, washed with 3 N hydrochloric acid followed by water, dried over anhydrous sodium carbonate, and the viscosity of the sample measured at 25° C. as described in an article by Kantor et al., Jour. American Chemical Society, 76, 5190 (1954). A parallel test was carried out identical in every way with the exception that about 2.5 parts (1 percent, by weight) dimethyl sulfoxide was added along with the KOH catalyst. The equilibrium viscosity (2.85 centisokes) was determined by shaking 50 ml. of the mixture of the octamethylcyclotetrasiloxane and the hexamethyldisiloxane, 0.5 ml. octamethylcyclotetrasiloxane, 1.25 ml. of 96 percent sulfuric acid for 48 hours at room temperature. The following Table I shows the time for obtainment of an equilibrium relationship in the case, where dimethyl sulfoxide was employed and in the other case, where dimethyl sulfoxide was absent.

Table I

| Time (Hours) | Centistokes of Reaction Product | |
| --- | --- | --- |
| | No Dimethyl Sulfoxide | 1% Dimethyl Sulfoxide |
| 0 | 1.26 | 1.27 |
| 0.5 | | 6.44 |
| 1 | 1.24 | 36.4 |
| 3 | | 20.2 |
| 30 | 1.25 | 3.49 |
| 119 | 1.25 | 2.95 |

The above tests show that the presence of small amounts dimethyl sulfoxide caused a rapid increase in molecular weight of the cyclic organopolysiloxane and in the case of the reaction of the hexamethyldisiloxane and octamethylcyclotetrasiloxane or other equilibration reactions, after continued heating the dimethyl sulfoxide accelerated the decrease in viscosity (indicating attainment of equilibrium conditions) to yield chain-stopped materials of the type described in the aforesaid U.S. Patents 2,469,888 and 2,469,890.

EXAMPLE 9

This example illustrates the preparation of cured organopolysiloxane elastomers prepared in accordance with our claimed invention. More particularly, 48 parts of stirred octamethylcyclotetrasiloxane was heated at about 95–96° C. with about 0.12 part of a 1% weight suspension of potassium hydroxide in octamethylcyclotetrasiloxane and about 0.22 part dimethyl sulfoxide (0.5% by weight dimethyl sulfoxide based on the octamethylcyclotetrasiloxane). After about 7½ minutes, the mixture became quite viscous and after 20 minutes it was too viscous to stir further. After a total of 45 minutes at the above temperature, the gum thus obtained (about 47 parts of intrinsic viscosity 4.1 when measured in toluene at 25° C.) was removed and compounded according to the following formulation:

| | Parts |
| --- | --- |
| Polydimethylsiloxane | 100 |
| Santocel C (silica aerogel) | 40 |
| Benzoyl peroxide | 1.86 |

This mixture of ingredients was press cured into a sheet for 20 minutes at 120° C. and then heated for 16 hours at 150° C. The resulting silicone rubber when tested at room temperature had a tensile strength of 915 p.s.i. and an elongation at break of 255%. When measured at 150° C., the tensile strength was 528 p.s.i. and an elongation of 141%.

EXAMPLE 10

In this example, octamethylcyclotetrasiloxane was reacted in the same manner as was done in Example 9 employing in this case 0.05 part of the potassium hydroxide suspension in octamethylcyclotetrasiloxane and 0.22 part of the dimethyl sulfoxide. The mixture became quite thick in ten minutes and after sixteen minutes was too thick to stir. Heating was continued at the temperature of 95–96° C. for a total of thirty minutes and the gum again was compounded and cured as in Example 9 to yield a rubber having a tensile strength of 880 p.s.i. and an elongation at break of 242% when measured at room temperature.

EXAMPLE 11

In this example, octamethylcyclotetrasiloxane containing 0.0012% potassium hydroxide and 0.01% dimethyl sulfoxide was heated at 95–98° C. After sixteen hours at this temperature, the reaction mixture became quite viscous and after twenty hours, it was a thick gum. If the same reaction is carried out but this time in the absence of any dimethyl sulfoxide, no increase in viscosity of the reaction mixture can be detected, even after twenty hours at the above temperature.

EXAMPLE 12

In this example, 48 parts of octamethylcyclotetrasiloxane was heated at about 95° C. with about 0.5 part of a 1% KOH weight suspension in octamethylcyclotetrasiloxane and 1%, by weight, of tetramethylene sulfone. After heating the mixture for fourteen minutes, it became quite viscous; after twenty minutes a thick gum began to form and after twenty-five minutes, the reaction mixture was so viscous that it caused the stirrer to stop.

EXAMPLE 13

About 48 parts octamethylcyclotetrasiloxane was heated at about 94° C. with 0.5 part of a 1% KOH weight suspension in octamethylcyclotetrasiloxane (0.01% KOH) and 1%, by weight, of tetramethylene sulfoxide. After about 1.2 minutes, there was a noticeable increase in viscosity and within 3½ minutes the reaction mixture had converted to a thick gum.

The catalysts which can be employed in the present invention can be varied widely, many examples of these catalysts being disclosed in the aforesaid Kantor et al. Patent 2,883,366, in U.S. Patent 2,490,357, issued December 6, 1949, and in U.S. Patent 2,443,353, issued June 15, 1948.

The concentration of the organosulfur compound can obviously be varied widely consistent with the desired reaction rates. Small amounts have profound effects on the rate of reaction and ordinarily it would be unnecessary to use amounts in excess of 5 to 10 weight percent of the organosulfur compound, based on the weight of the organopolysiloxane. The conditions of reaction can be varied widely as is apparent from the foregoing disclosures. In addition to the gums which may be prepared by means of our process, it is also possible to prepare potting gels from organopolysiloxanes containing the organosulfur compound and a basis catalyst. Lubricating and dielectric fluids similar to those described in the aforesaid Patnode Patents 2,469,888 and 2,469,890, can also be prepared by means of the equilibration of the proper organopolysiloxanes with the organosulfur compound. The organopolysiloxane gums prepared employing the method of the present invention, have the same utility as those prepared by conventional methods. In addition, the gums may be compounded with fillers, such as silica aerogel and fume silica, and a crosslinking agent, such as benzoyl peroxide, and cured at elevated temperatures. Gums obtained in this manner have good heat stability at temperatures as high as 300° C. recommending their use as insulation for wires and as gaskets in high temperature applications. The oils prepared by the method of the present invention are valuable as hydraulic fluids and as lubricants. Resins which are prepared by this method may be advantageously employed as coating and insulating compositions.

It will of course be apparent to those skilled in the art that in addition to the methylpolysiloxanes employed in the foregoing examples, other organopolysiloxanes, many examples of which have been described above, can be used without departing from the scope of the invention. Thus, one may intercondense methylpolysiloxanes with phenylpolysiloxanes, for instance, octamethylcyclotetrasiloxane with octaphenylcyclotetrasiloxane to form methyl phenylpolysiloxane gums.

What we claim as new and desire to secure by Letters Patent of the United States is:

1. The process for causing siloxane rearrangement which comprises contacting an organopolysiloxane having the formula

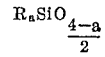

with an alkaline rearrangement and condensation catalyst selected from the class consisting of alkali-metal hydroxides, alkali-metal silanolates, quaternary ammonium compounds, and quaternary phosphonium compounds of the formula $(R')_4POR''$, in the presence of at least 0.005 percent, by weight, based on the weight of the organopolysiloxane, of an organosulfur compound of the class consisting of alkyl sulfoxides and alkyl sulfones containing at most 4 carbon atoms, where R and R' are members selected from the class of radicals consisting of alkyl, alkenyl, aryl, aralkyl, alkaryl, halogenated aryl, cyanoalkyl radicals, and mixtures of such radicals, and R'' is a member selected from the class consisting of hydrogen and alkyl radicals, and $a$ has an average value of from about 1.2 to less than 3.

2. The process as in claim 1 in which the organopolysiloxane is a methylpolysiloxane.

3. The process as in claim 1 in which the catalyst is potassium hydroxide.

4. The process for effecting siloxane rearrangement of a methylpolysiloxane containing an average of from 1.2 to less than 3 methyl groups per silicon atom, which comprises contacting the methylpolysiloxane with an alkaline rearrangement and condensation catalyst selected from the class consisting of alkali-metal hydroxides, alkali-metal silanolates, quaternary ammonium compounds, and quaternary phosphonium compounds of the formula $(R')_4POR''$, in the presence of at least 0.005 percent, by weight, based on the weight of the methylpolysiloxane, of dimethyl sulfoxide, where R' is a member selected from the class of radicals consisting of alkyl, alkenyl, aryl, aralkyl, alkaryl, halogenated aryl, cyanoalkyl radicals, and mixtures of such radicals, and R'' is a member selected from the class consisting of hydrogen and alkyl radicals.

5. The process for effecting siloxane rearrangement of a methylpolysiloxane containing an average of from 1.2 to less than 3 methyl groups per silicon atom, which comprises contacting the methylpolysiloxane with an alkaline rearrangement and condensation catalyst selected from the class consisting of alkali-metal hydroxides, alkali-metal silanolates, quaternary ammonium compounds, and quaternary phosphonium compounds of the formula $(R')_4POR''$, in the presence of at least 0.005 percent, by weight, based on the weight of the methylpolysiloxane of dimethyl sulfone, where R' is a member selected from the class of radicals consisting of alkyl, alkenyl, aryl, aralkyl, alkaryl, halogenated aryl, cyanoalkyl radicals, and mixtures of such radicals, and R'' is a member selected from the class consisting of hydrogen and alkyl radicals.

6. The process for effecting siloxane rearrangement of a methylpolysiloxane containing an average of from 1.2 to less than 3 methyl groups per silicon atom, which comprises contacting the methylpolysiloxane with an alkaline rearrangement and condensation catalyst selected from the class consisting of alkali-metal hydroxides, alkali-metal silanolates, quaternary ammonium compounds, and quaternary phosphonium compounds of the formula (R')$_4$POR", in the presence of at least 0.005 percent, by weight, based on the weight of the methylpolysiloxane of tetramethylene sulfone, where R' is a member selected from the class of radicals consisting of alkyl, alkenyl, aryl, aralkyl, alkaryl, halogenated aryl, cyanoalkyl radicals, and mixtures of such radicals, and R" is a member selected from the class consisting of hydrogen and alkyl radicals.

7. The process for effecting siloxane rearrangement of a methylpolysiloxane containing an average of from 1.2 to less than 3 methyl groups per silicon atom, which comprises contacting the methylpolysiloxane with an alkaline rearrangement and condensation catalyst selected from the class consisting of alkali-metal hydroxides, alkali-metal silanolates, quaternary ammonium compounds, and quaternary phosphonium compounds of the formula (R')$_4$POR", in the presence of at least 0.005 percent, by weight, based on the weight of the methylpolysiloxane of tetramethylene sulfoxide, where R' is a member selected from the class of radicals consisting of alkyl, alkenyl, aryl, aralkyl, alkaryl, halogenated aryl, cyanoalkyl radicals, and mixtures of such radicals, and R" is a member selected from the class consisting of hydrogen and alkyl radicals.

8. The process for polymerizing octamethylcyclotetrasiloxane to a methylpolysiloxane gum which comprises heating the latter in the presence of an alkaline rearrangement and condensation catalyst composed essentially of KOH and at least 0.005 percent, by weight, based on the weight of the octamethylcyclotetrasiloxane, of dimethyl sulfoxide.

9. The process for effecting molecular weight change and interaction of a mixture of ingredients comprising a cyclic organopolysiloxane and a chain-stopped organopolysiloxane of the formula

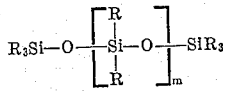

the aforesaid mixture of organopolysiloxanes containing an average of from 2 to less than 3 organic groups per silicon atom, which process comprises heating the mixture of ingredients in the presence of an alkaline rearrangement and condensation catalyst selected from the class consisting of alkali-metal hydroxides, alkali-metal silanolates, quaternary ammonium compounds, and quaternary phosphonium compounds of the formula (R')$_4$POR", in the presence of at least 0.005 percent, by weight, based on the weight of the methylpolysiloxane, of dimethyl sulfoxide, where the organic radicals of the cyclic organopolysiloxane, R and R' are members selected from the class of radicals consisting of alkyl, alkenyl, aryl, aralkyl, alkaryl, halogenated aryl, cyanoalkyl radicals, and mixtures of such radicals, R" is a member selected from the class consisting of hydrogen and alkyl radicals, and $m$ is a whole number equal to from 0 to 20.

10. The process for effecting interaction between octamethylcyclotetrasiloxane and hexamethyldisiloxane which comprises heating the mixture of ingredients in the presence of a basic rearrangement and condensation catalyst composed essentially of KOH and at least 0.005 percent, by weight, based on the total weight of the mixture of siloxanes, of dimethyl sulfoxide.

11. The process for polymerizing octamethylcyclotetrasiloxane which comprises heating the latter in the presence of an alkaline rearrangement and condensation catalyst composed essentially of KOH and at least 0.005 percent, by weight, based on the weight of the octamethylcyclotetrasiloxane, of tetramethylene sulfone.

12. The process for polymerizing octamethylcyclotetrasiloxane which comprises heating the latter in the presence of an alkaline rearrangement and condensation catalyst composed essentially of KOH and at least 0.005 percent, by weight, based on the weight of the octamethylcyclotetrasiloxane, of tetramethylene sulfoxide.

13. The process for effecting interaction between octamethylcyclotetrasiloxane and a methylpolysiloxane of the formula

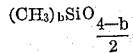

where $b$ has a value from 2.001 to 2.5, thereby to obtain a linear chain-stopped methylpolysiloxane, which comprises heating the mixture of ingredients in the presence of an alkaline rearrangement and condensation catalyst selected from the class consisting of alkali-metal hydroxides, alkali-metal silanolates, quaternary ammonium compounds, and quaternary phosphonium compounds of the formula (R')$_4$POR", in the presence of at least 0.005 percent, by weight, based on the total weight of the methylpolysiloxanes, of dimethyl sulfoxide, where R' is a member selected from the class of radicals consisting of alkyl, alkenyl, aryl, aralkyl, alkaryl, halogenated aryl, cyanoalkyl radicals, and mixtures of such radicals, and R" is a member selected from the class consisting of hydrogen and alkyl radicals.

14. A composition of the matter comprising (1) an organopolysiloxane having the formula

(2) an alkaline rearrangement and condensation catalyst selected from the class consisting of alkali-metal hydroxides, alkali-metal silanolates, quaternary ammonium compounds, and quaternary phosphonium compounds of the formula (R')$_4$POR", and (3) at least 0.005 percent, by weight, based on the weight of (1) of an organosulfur compound selected from the class consisting of alkyl sulfoxides and alkyl sulfones containing at most 4 carbon atoms, where $a$ has a value from 1.2 to less than 3, R and R' are members selected from the class of radicals consisting of alkyl, alkenyl, aryl, aralkyl, alkaryl, halogenated aryl, cyanoalkyl radicals, and mixtures of such radicals, and R" is a member selected from the class consisting of hydrogen and alkyl radicals.

15. A composition of the matter comprising octamethylcyclotetrasiloxane, an alkaline rearrangement and condensation catalyst composed essentially of KOH, and at least 0.005 percent, by weight, based on the weight of the octamethylcyclotetrasiloxane, of dimethyl sulfoxide.

16. A composition of the matter comprising octamethylcyclotetrasiloxane, hexamethyldisiloxane, a condensation and rearrangement catalyst composed essentially of KOH, and at least 0.005 percent, by weight, based on the total weight of the aforesaid two siloxanes, of dimethyl sulfoxide.

17. A composition of the matter comprising octamethylcyclotetrasiloxane, an alkaline rearrangement catalyst composed essentially of KOH, and at least 0.005 percent, by weight, based on the weight of the octamethylcyclotetrasiloxane, of tetramethylene sulfone.

18. A composition of the matter comprising octamethylcyclotetrasiloxane, an alkaline rearrangement and condensation catalyst composed essentially of KOH, and at least 0.005 percent, by weight, based on the weight of the octamethylcyclotetrasiloxane, of tetramethylene sulfoxide.

References Cited by the Examiner

UNITED STATES PATENTS

| | | | |
|---|---|---|---|
| 2,833,801 | 5/58 | Holbrook | 260—46.5 |
| 2,877,211 | 3/59 | Nitzsche et al. | 260—46.5 |
| 2,997,457 | 8/61 | Kantor | 260—46.5 |
| 3,017,386 | 1/62 | Brown et al. | 260—46.5 |
| 3,050,485 | 8/62 | Nitzsche et al. | 260—46.5 |

MURRAY TILLMAN, *Primary Examiner.*

J. R. LIBERMAN, *Examiner.*